(12) United States Patent
Heiniger et al.

(10) Patent No.: US 10,316,851 B2
(45) Date of Patent: Jun. 11, 2019

(54) CONNECTOR FOR ELECTRICAL DEVICES

(71) Applicants: Sonia Heiniger, Villars-sur-Glane (CH); Johan Cosandey, Lausanne (CH); Charles Humbert, Lechelles (CH)

(72) Inventors: Sonia Heiniger, Villars-sur-Glane (CH); Johan Cosandey, Lausanne (CH); Charles Humbert, Lechelles (CH)

(73) Assignees: Jacques Finkbeiner, La Fouly (CH); Sonia Heiniger, Villars-sur-Glane (CH); Johan Cosandey, Lausanne (CH)

( * ) Notice: Subject to any disclaimer, the term of this patent is extended or adjusted under 35 U.S.C. 154(b) by 0 days.

(21) Appl. No.: 15/745,179

(22) PCT Filed: Jun. 23, 2016

(86) PCT No.: PCT/EP2016/064603
§ 371 (c)(1),
(2) Date: Jul. 25, 2018

(87) PCT Pub. No.: WO2017/012824
PCT Pub. Date: Jan. 26, 2017

(65) Prior Publication Data
US 2018/0328368 A1    Nov. 15, 2018

(30) Foreign Application Priority Data

Jul. 17, 2015 (EP) .................................... 15177375

(51) Int. Cl.
*H01R 35/00* (2006.01)
*F04D 25/08* (2006.01)
(Continued)

(52) U.S. Cl.
CPC ............ *F04D 25/088* (2013.01); *F21V 21/03* (2013.01); *F21V 23/06* (2013.01); *H01R 13/625* (2013.01); *H01R 33/465* (2013.01); *H02G 3/20* (2013.01)

(58) Field of Classification Search
CPC ...... F04D 25/088; H02G 3/20; H01R 33/465; H01R 13/625; F21V 23/06; F21V 21/03
(Continued)

(56) References Cited

U.S. PATENT DOCUMENTS 3,638,170 A    1/1972   Clement et al.
3,985,417 A    10/1976  Fenton
(Continued)

FOREIGN PATENT DOCUMENTS

DE          31 42 508 A1      5/1983
DE    20 2012 103 559 U1      1/2013
(Continued)

OTHER PUBLICATIONS

International Search Report dated Dec. 12, 2016, in PCT/EP2016/064603 filed Jun. 23, 2016.

*Primary Examiner* — Jean F Duverne
(74) *Attorney, Agent, or Firm* — Oblon, McClelland, Maier & Neustadt, L.L.P.

(57) ABSTRACT

A quick connection device includes a female socket forming an electrical fixture. The female socket includes a cavity receiving a first electrical connector connected to an electrical grid. The quick connection device also includes a male plug including a second electrical connector and having a complementary shape to the female socket cavity. The male plug is able to change from an unlocked position in which the male plug can be inserted into the female socket, to a locked position in which the male plug is fixed to the female socket and the second electrical connector cooperates with
(Continued)

the first electrical connector. The quick connection device also includes an electrical conductor extending through the male plug. The second electrical connector includes structure arranged to bear the weight of the electrical device.

21 Claims, 6 Drawing Sheets

(51) Int. Cl.
*F21V 21/03* (2006.01)
*F21V 23/06* (2006.01)
*H01R 13/625* (2006.01)
*H01R 33/46* (2006.01)
*H02G 3/20* (2006.01)

(58) Field of Classification Search
USPC .......................................... 439/537
See application file for complete search history.

(56) References Cited

U.S. PATENT DOCUMENTS

| | | | |
|---|---|---|---|
| 6,146,191 A | 11/2000 | Kerr, Jr. et al. | |
| 6,325,654 B1 | 12/2001 | Kerr, Jr. et al. | |
| 6,464,524 B1 | 10/2002 | Kerr, Jr. et al. | |
| 2003/0133804 A1 | 7/2003 | Kerr, Jr. et al. | |
| 2005/0036321 A1 | 2/2005 | Ward | |
| 2013/0104884 A1* | 5/2013 | Vazales | A61B 1/267 128/202.16 |
| 2014/0163664 A1* | 6/2014 | Goldsmith | A61B 17/00491 623/1.11 |
| 2015/0292692 A1 | 10/2015 | Elmvang | |
| 2016/0259374 A1* | 9/2016 | Breiwa | H02J 50/10 |

FOREIGN PATENT DOCUMENTS

| | | |
|---|---|---|
| WO | 2012/079550 A1 | 6/2012 |
| WO | 2014/053145 A1 | 4/2014 |

* cited by examiner

Fig. 1a
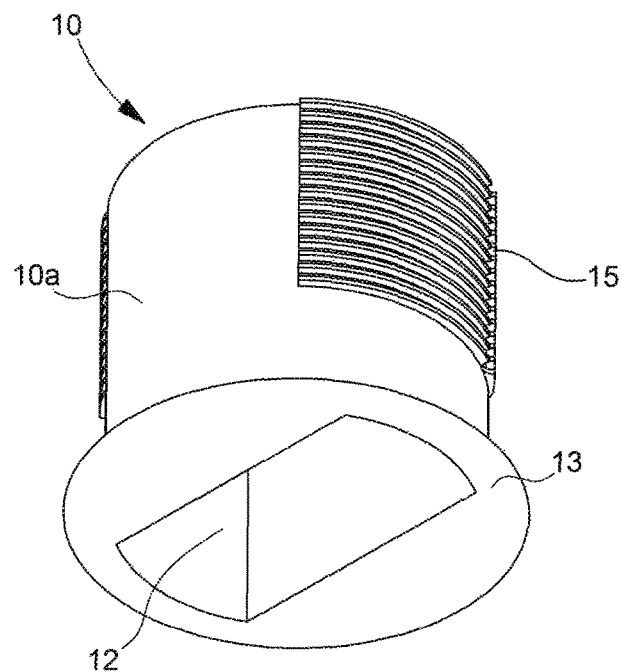
Fig. 1b
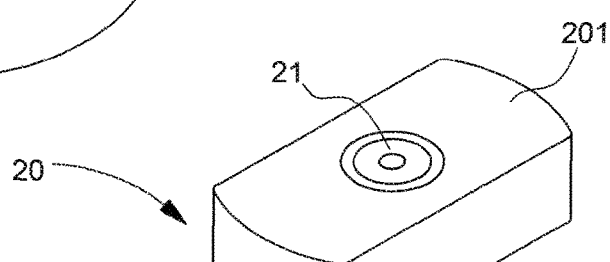
Fig. 1c
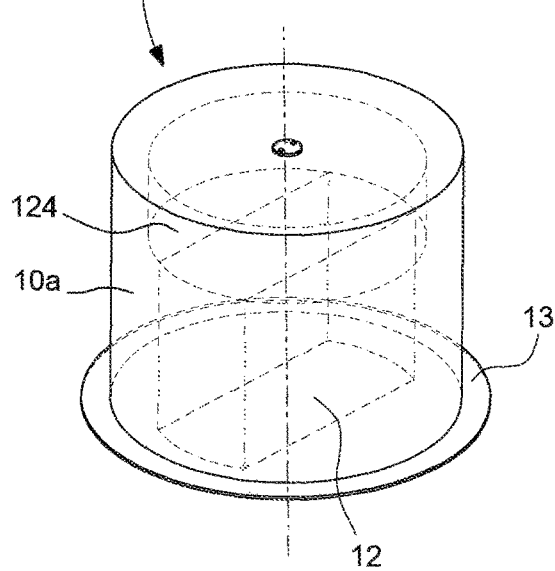
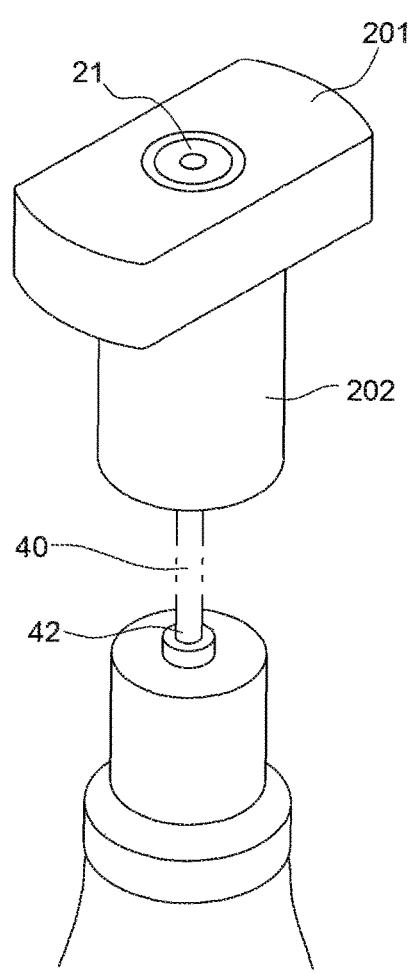

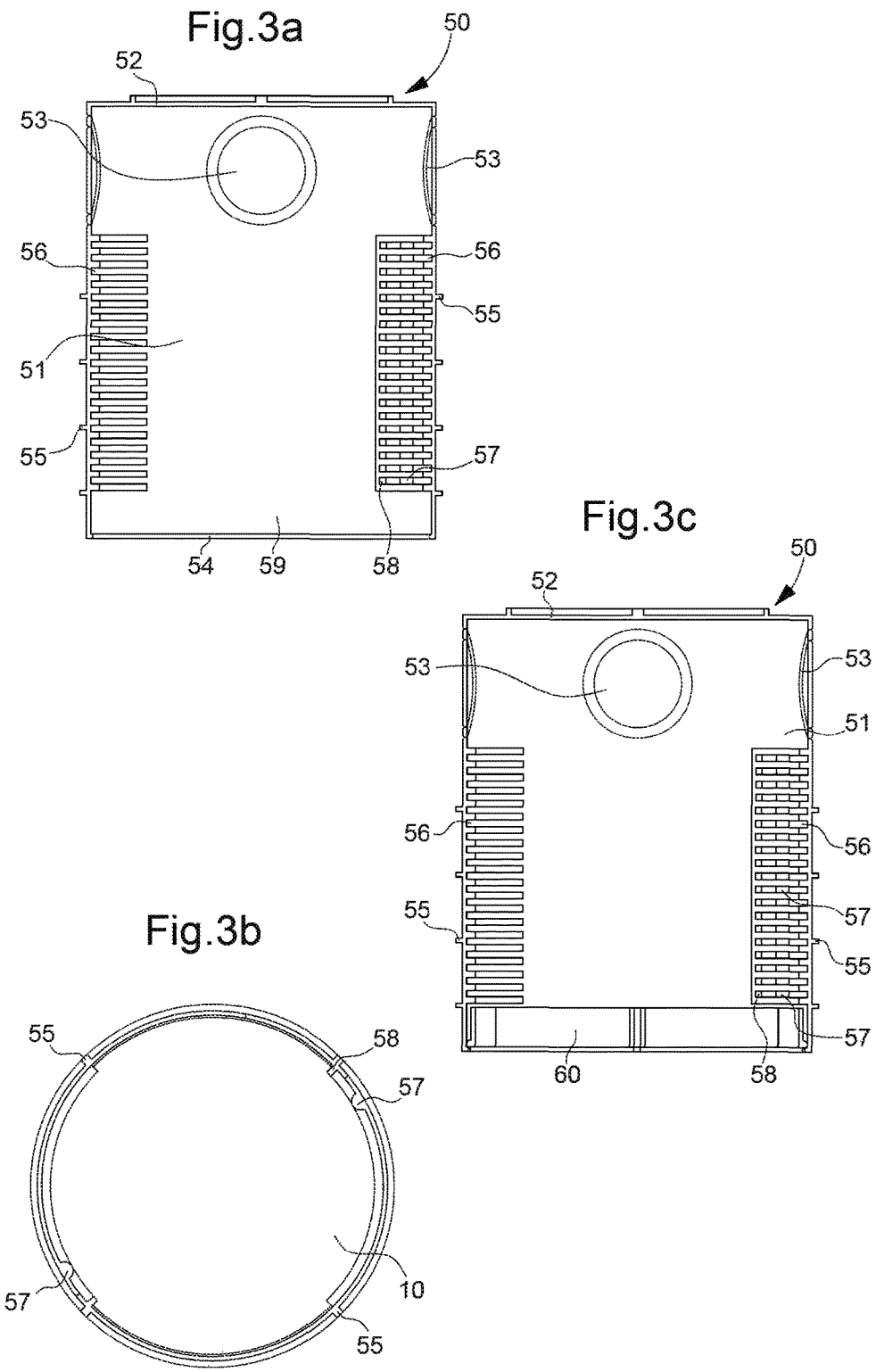

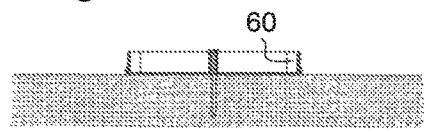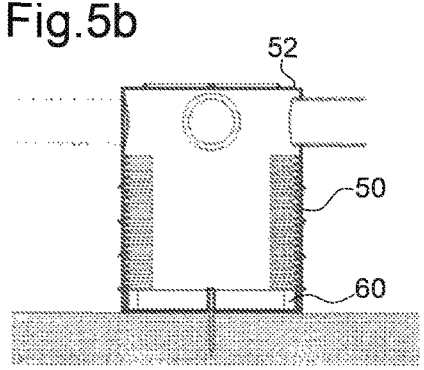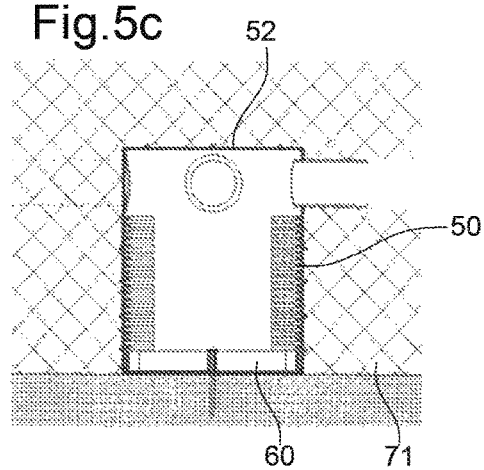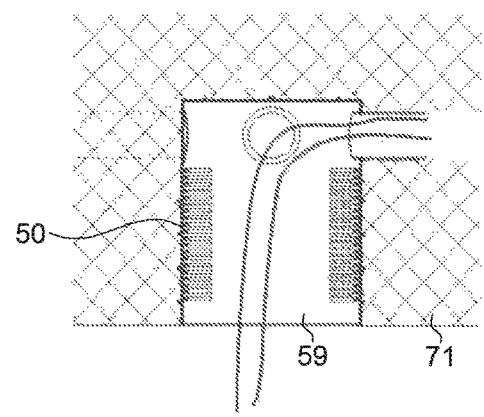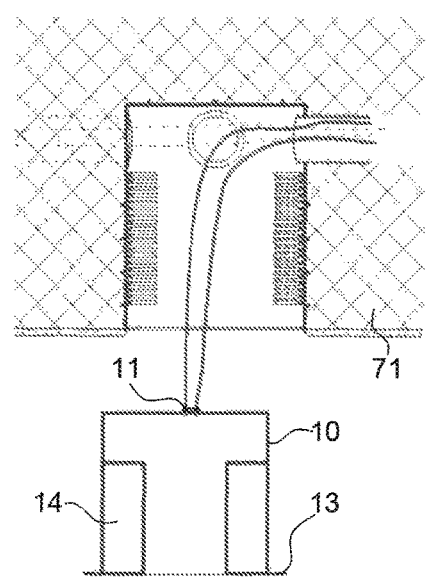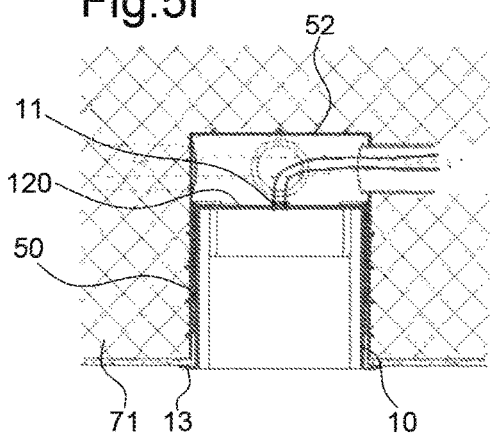

CONNECTOR FOR ELECTRICAL DEVICES

FIELD OF THE INVENTION

The invention relates to electrical devices, and more particularly to connectors that allow an electrical device to be installed in a ceiling or on a wall.

BACKGROUND OF THE INVENTION

There is known from GB Patent 2435722 an electrical connector for quickly fixing and connecting an electrical device to an electricity grid in a ceiling. The electrical connector is fixed in an electrical fixture by means of a bayonet system.

This device has the drawback of being complicated to install. Indeed, the connector first requires the electrical device to be connected to the connector via an electrical connection terminal. Further, such a connector has plug connectors fixed by means of screws and thus cannot ensure a reliable electrical connection over time and following the repeated installation/removal of electrical devices such as lamps.

SUMMARY OF THE INVENTION

It is an object of the invention to overcome the various drawbacks of these known techniques.

More precisely, it is an object of the invention to provide a connector which is simple and inexpensive to implement.

These objects, in addition to others which will appear more clearly hereafter, are achieved according to the invention by means of a quick connection device, the device including:
- a female socket forming an electrical fixture intended to be installed in a wall mount, the female socket including a cavity receiving a first electrical connector intended to be connected at least indirectly to an electrical grid,
- a male plug comprising a second electrical connector and having a complementary shape to the cavity in the female socket, configured to removably engage in the female part, the male plug being able to change from an unlocked position in which the male plug can be inserted into the female socket, to a locked position in which the male plug is fixed to the female socket and the second electrical connector cooperates with the first electrical connector,
- an electrical conductor comprising a first end connected to the second electrical connector, and another end configured to be connected to an electrical device, with the electrical conductor extending through the male plug.

According to the invention, the second electrical connector includes means arranged to bear the weight of the electrical device.

The invention also concerns a connection device including:
- a female socket intended to be installed in a ceiling, the female socket comprising a cavity having a bottom receiving a first electrical connector intended to be at least indirectly connected to an electrical grid,
- a male plug comprising a second electrical connector and having a complementary shape to the cavity in the female socket, configured to removably engage in the female part, the male plug being able to change from an unlocked position in which the male plug can be inserted into the female socket, to a locked position in which the male plug is secured to the female socket and the second electrical connector cooperates axially with the first electrical connector,
- an electrical conductor comprising a first end connected to the second electrical connector, and another end configured to be connected to an electrical device, with the electrical conductor extending through the male plug.

According to the invention, the male plug is in one piece and is T-shaped; the body of the T shape is cylindrical and the head of the T is substantially oblong.

In accordance with other advantageous variants of the invention:
- the second electrical connector is disposed on top of the head of the T of the male plug;
- the second electrical connector is disposed on one of the sides of the head of the T of the male plug;
- the male plug (20) and the electrical conductor (40) are two distinct elements, the electrical conductor (40) being fitted inside the male plug (20);
- the means for bearing the weight of the electrical device comprise a housing which is arranged inside the male plug and configured to receive the second electrical connector, the housing comprising a shoulder arranged to bear the weight of the electrical device;
- the second electrical connector has a complementary shape to the shoulder, such that the second electrical connector rests on the shoulder of the housing and bears the weight of the electrical device;
- the second electrical connector is flush with the surface of the male plug, such that the second electrical connector is held in contact with the first electrical connector when the male plug is in the locked position;
- the second electrical connector and the electrical conductor form a one-piece element;
- the second electrical connector is free to rotate inside the housing;
- the device includes means for engaging the male part in the female part, such as a bayonet mount system;
- the cavity in the female socket includes means for locking the male plug in the female socket in a locked position;
- the male plug and the female socket are made of plastic material and the second electrical connector is made of vulcanized rubber;
- the female part includes at least one electronic device connected to the electrical grid independently of the first electrical connector;
- the female part includes at least one housing configured to receive the electronic device;
- the electronic device is a wireless communication means;
- the electronic device is a smoke detector.

The invention also concerns a recessed housing including:
- a body having a bottom;
- openings for the passage of cables, arranged in proximity to the bottom;
- grooves, formed on the outer wall of the body, to stiffen the recessed housing.

The invention also concerns an assembly comprising:
- a recessed housing intended to be permanently fixed in a mount, the recessed housing comprising:
- a body having a bottom,
- openings for the passage of electrical cables, arranged in proximity to the bottom;
- ribs, formed on the outer wall of the body, to stiffen the recessed housing,
- locking and adjustment means, formed on the inner surface of the body, and configured to cooperate with the female socket, a female socket comprising grooves formed on its outer wall, arranged to cooperate with the locking and adjustment means of the recessed housing in order to adjust the position of the female socket with respect to the recessed housing.

In accordance with other advantageous variants of the invention:
- the grooves cooperate with the locking means of the recessed housing in order to hold the female socket in position with respect to the recessed housing;
- the locking means include at least one protuberance configured to cooperate with the female socket of the connection device;
- the adjustment means include peripheral grooves formed on the inner surface of the side wall, intended to cooperate with the female socket of the connection device.

The invention also concerns a mounting kit for connecting an electrical device in a connection device, comprising a recessed housing intended to be permanently fixed in a wall mount, a female socket intended to be installed in the recessed housing, the female socket comprising a first electrical connector intended to be connected to the electrical grid, a male plug comprising a second electrical connector and adapted to cooperate with the female socket such that the second electrical connector cooperates with the first electrical connector, and an electrical conductor comprising a first end connected to the second electrical connector, and another end configured to be connected to an electrical device, with the electrical conductor extending through the male plug.

The mounting kit according to the invention comprises an electrical device which could be, for example, a light or a fan.

The invention also concerns a method for mounting a mounting kit according to the invention, the method comprising the following steps;
- positioning the recessed housing;
- pouring the concrete slab forming the ceiling;
- pulling or running the electrical wires through the recessed housing;
- connecting the first connector of the female socket to the electrical wires;
- inserting and locking the female socket in the recessed housing;
- inserting and locking the male plug in the female socket so that the first and second electrical connectors cooperate with each other.

BRIEF DESCRIPTION OF THE DRAWINGS

Other features and advantages will appear clearly from the following description, given by way of non-limiting illustration, with reference to the annexed drawings, in which:

FIGS. 1a and 1b are respectively perspective views of a female socket and a male plug of a connection device according to the invention.

FIG. 1c is a perspective view of a female socket schematically showing in dotted lines the configuration of the inner cavity of the latter.

FIGS. 3a to 3c are cross-sectional views of a recessed housing according to the invention.

FIGS. 5a to 5f illustrate a method for installing a kit according to the invention.

DETAILED DESCRIPTION OF PREFERRED EMBODIMENTS

Figure 2A:
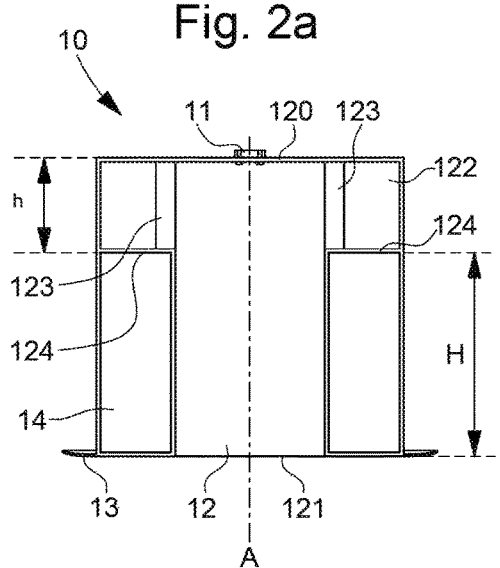
FIG. 2a is a cross-sectional view of a female socket according to the invention.

A connection device according to one embodiment of the invention will now be described below referring jointly to FIGS. 1a, 1b, 1c, 2a to 2c, 3a to 3c, 4a, 4b, 6a and 6b.

In the following, a "wall mount" includes walls, ceilings or floors or any other building surface.

The invention concerns a connection device 1 comprising:
- a female socket 10 intended to be installed in a wall mount, female socket 10 comprising a cavity 12 having a bottom 120 receiving a first electrical connector 11 intended to be at least indirectly connected to an electrical grid,
- a male plug 20, which is generally T-shaped here, comprising a second electrical connector 21 and having a complementary shape to female socket cavity 12, configured to removably engage in female part 10, male plug 20 being able to change from an unlocked position in which male plug 20 can be inserted into female socket 10, to a locked position in which male plug 20 is secured to female socket 10—via the bars of the T resting on a complementary surface provided in cavity 12 like a bayonet mount device—and second electrical connector 21 cooperates axially with first electrical connector 11,
- an electrical conductor 40 comprising a first end 41 connected to second electrical connector 21, and another end 42 configured to be connected to an electrical device, the electrical conductor extending through male plug 20.

According to a particularly advantageous aspect of the invention, the second electrical connector 21 includes means arranged to bear the weight of the electrical device.

The device according to the invention includes two main components, namely a female plug 10 arranged to be permanently fixed in a ceiling 71 intended for such purpose, and a male plug 20 arranged to be secured and electrically connected to the electrical device.

Female socket 10 can be installed, preferably by a construction professional, ideally during construction of the dwelling, for example by pouring ceiling 71 around a moulding core of suitable dimensions. Once the moulding core has been removed, female socket 10 can be installed in the cavity, and first electrical connector 11 is electrically connected to the electrical grid of the dwelling.

More precisely, and as illustrated in the Figures, female socket 10 takes the form of a cylinder having a substantially parallelepiped cavity 12, centred around an axis A that coincides with the axis of revolution forming the cylinder. Cavity 12 extends over all or part of the top of female socket 10 and is provided with an entrance 121 on the lower face of female socket 10. Advantageously, bottom 120 can be pierced in proximity to the centre to allow the passage of first electrical connector 11, which is intended to be connected to the electrical grid. First electrical connector 11 is mounted integrally on bottom 120, for example by screw fixing or by press fitting and bonding.

Female socket 10 includes a cylindrical outer envelope 10a ending at the bottom of the socket, close to the opening of cavity 12, in a support collar 13 configured to abut against ceiling 71 and conceal the peripheral portion located around female socket 10. Outer envelope 10a further includes a series of grooves 15 extending around the periphery of the envelope and spaced apart from each other along axis A. Grooves 15 both stiffen outer envelope 10a and also serve as anchoring elements for holding outer envelope 10a in the concrete slab in which the female socket will be placed.

In the example, these grooves are interrupted around the circumference of the envelope, but could, in a variant that is not represented, extend continuously around the envelope. Preferably, these grooves extend in a helix at the surface of said outer envelope 10a. The number and height of the grooves is variable and depends, in particular, on the weight of the light intended to be connected to the device of the invention. In a variant embodiment of female socket 10, grooves 15 can be completely omitted or replaced, for example, by a collar extending from envelope 10a close to first electrical connector 11.

According to a variant embodiment of the invention, female part 10 may have at least one pocket recess 14 configured to receive an electronic device connected to the electrical grid independently of first electrical connector 11. For example, the electronic device could be a wireless communication means such as a wifi or LTE module. This electronic device could also consist of a smoke detector.

As can be observed in view 1c combined with the cross-sectional view of FIG. 2a in which grooves 15 are not represented, the cavity of female socket 10 leads to a cylindrical recess 122 of diameter D, centred around axis A, the bottom of which coincides with bottom 120 of female socket 10. Cavity 12 is configured to guide male part 20 into female part 10 as far as cylindrical recess 122.

Figure 2B:
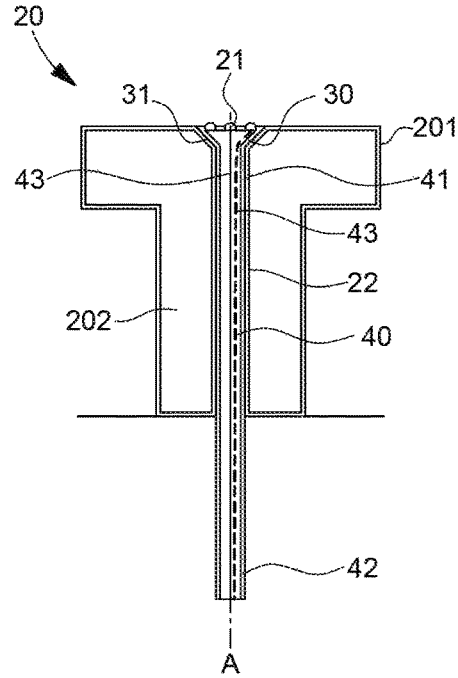
FIGS. 2b and 2c are cross-sectional views of a male plug according to first and second embodiments of the invention.

Male plug 20, seen in particular in FIGS. 1a and 2b, includes a first, substantially parallelepiped portion, called the head 201 of male plug 20, and thus of similar shape to cavity 12, and a second, cylindrical portion, called the body 202 of male plug 20.

According to a particular embodiment of the invention, male plug 20 is in one piece and is T-shaped; the body of the T shape is cylindrical and the head of the T is substantially oblong.

According to this embodiment, second electrical connector 21 can be disposed on the top or one of the sides of the head of the T of male plug 20.

Advantageously, the height of the male plug body 202 is substantially identical to the height H of cavity 12, and the height of head 201 of male plug 20 is substantially identical to height h of recess 122.

Head 201 of male plug 20 forms a first bayonet mounting member, the second mounting member being formed by recess 122. In the embodiment illustrated in the Figures, male plug 20 can be engaged in cavity 12 of female socket 10. Head 201 of male plug 20 has dimensions close to those of cavity 12 so as to leave a slight play between the two, to allow male plug 20 to be easily inserted into female socket 10.

Male plug 20 is rotatably mounted in female socket 10 once head 201 is stopped against bottom 120. Head 201 then rests against the lower edges 124 of recess 122, preventing male plug 20 from leaving female socket 10. As can be observed in the cross-sectional view of FIG. 2b, head 201 of male plug 20 includes a second electrical connector 21 configured to cooperate axially with first electrical connector 11.

According to a preferential embodiment of the invention, recess 122 includes, on its side wall, protuberances 124 forming a stop indicating that the rotation of male plug 20 is sufficient to hold it securely in female socket 10. Protuberances 123 can be arranged at 180° with respect to each other, but other arrangements are possible, to allow male plug 20 several positions with respect to female socket 10.

Male plug 20 and electrical conductor 40 are two distinct elements, electrical conductor 40 being fitted inside male plug 20, in order to simplify the manufacture and mounting of device 1.

To mount second electrical connector 21 to male plug 20, the second connector is first connected to electrical conductor 40, then electrical conductor 40 is inserted and fitted inside a duct 22 which passes throughout the height of male plug 20, until second electrical connector 21 abuts against male plug 20.

Thus, to assemble male plug 20 to female socket 10, male plug head 201 is inserted into cavity 12 of female socket 10 and slid to bottom 120 of female plug 10, then male plug 20 is rotated in recess 122 to move head 201 into abutment against protuberances 123.

The male plug can then change from an unlocked position in which male plug 20 can be inserted into female socket 10, to a locked position in which male plug 20 is secured to female socket 10 and second electrical connector 21 cooperates axially with first electrical connector 11. Such a mechanism allows for quick and easy assembly of an electrical device to the ceiling.

According to a variant of the invention, female socket 10 includes means for locking male plug 20 in female socket 10 in a locked position. These locking means may, for example, comprise lugs on the wall of recess 122 in proximity to protuberances 123, so as to create a friction force sufficient to hold male plug 20 in place in female socket 10.

Figure 2C:
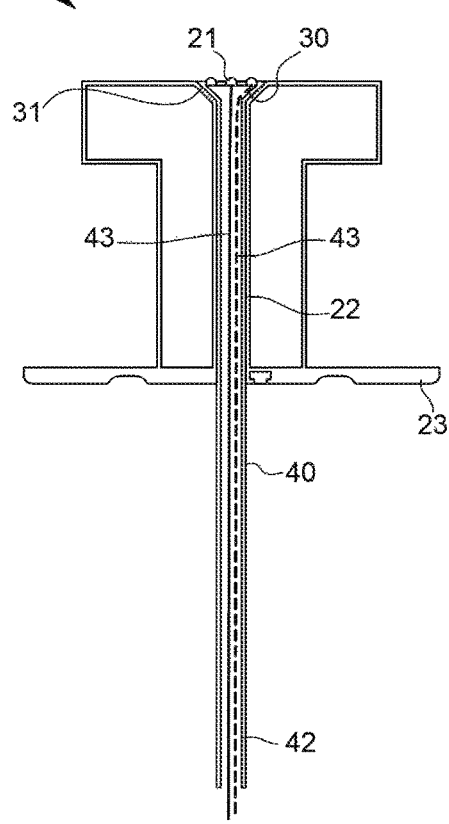
Figure 4A:
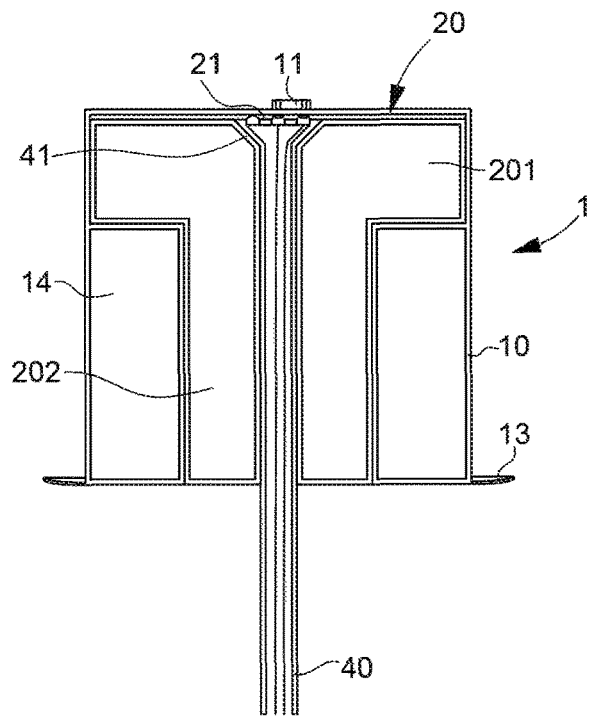
FIGS. 4a and 4b are respectively cross-sectional views of a male plug housed inside the female socket and of a male plug/female socket assembly secured inside a recessed housing.
Figure 4B:
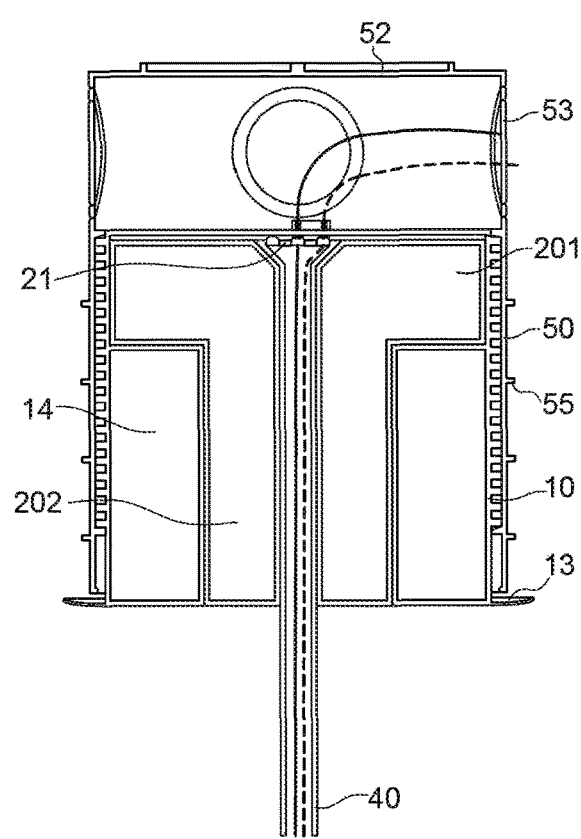

Advantageously, male plug 20 is integral with an electrical device to be installed. FIGS. 2b and 2c illustrate a male plug 20 receiving second electrical connector 21, and an electrical conductor 40 receiving at least two electrical cables 43. Electrical conductor 40 has a first end 41 connected to second electrical connector 21, and another end 42 configured to be connected to an electrical device, the electrical conductor extending through male plug 20 via duct 22. Duct 22 preferably has a circular section, extends throughout all or part of the height of male plug 20, and is centred on axis A.

The assembly of electrical conductor 4 and male plug 20 is preferably carried out by the manufacturer of the electrical device, in order to simplify as much as possible the work to be performed by the end user. If necessary, as illustrated in FIG. 2c, male plug 20 can include a mounting plate 23 provided with orifices for the assembly of any type of lamp, for example, wall lights, or suspension lamps.

According to the invention, male plug 20 includes means for bearing the weight of the electrical device when the male plug is secured to the female socket. These means comprise a housing 30 which is arranged inside male plug 20 and configured to receive second electrical connector 21, housing 30 comprising a shoulder 31 arranged to bear the weight of the electrical device when the device is mounted.

More precisely, and as illustrated in FIG. 2b, housing 30 is arranged in head 201 of male plug 20, preferably at the centre of the male plug, so that first and second electrical connectors 11 and 21 are aligned on the same axis A, with duct 22 leading to housing 30. As represented in the Figures, housing 30 is of conical shape and shoulder 31 is formed by the oblique wall of housing 30. Naturally, other housing shapes can be implemented, for example parallelepiped or circular, with dimensions greater than the diameter of duct 22 through which electrical conductor 4 passes.

According to a particularly advantageous aspect of the invention, second electrical connector 21 has a complementary shape to shoulder 31, such that second electrical connector 21 rests on shoulder 31 of housing 30 and bears the weight of the electrical device. Second electrical connector 21 could be free in rotation about axis A inside housing 30 so as to facilitate the rotation of the electrical device connected to second electrical connector 21, by means of electrical conductor 40.

As represented in the Figures, second electrical connector 21 is flush with the surface of male plug 20, such that second electrical connector 21 is held in contact with first electrical connector 11 when male plug 20 is in the locked position.

Electrical connectors 11 and 21 can each have two contact plugs, these contact plugs could be formed by strip springs to compensate for any play between male plug 20 and female socket 10.

According to a particular aspect of the invention, second electrical connector 21 and electrical conductor 40 can form a one-piece element, electrical cables 43 being connected to second electrical connector 21 and the assembly then being covered with a sheath for example.

Male plug 20, female socket 10 and second electrical connector 21 can be made of vulcanized rubber in order to increase their tensile strength and thus increase the lifetime of the device.

The invention also concerns a recessed housing 50 illustrated in FIGS. 3a and 3b. Recessed housing 50 is formed by a body 51 made of moulded plastic having a cylindrical section, with a bottom 52 and fracturable openings 53, in proximity to bottom 52, for the passage of electrical cables or conductors. An annular rim 54 is arranged opposite bottom 52 and delimits the circumferential periphery of opening 59 through which will be engaged female socket 10.

Housing 50 also includes ribs 55, formed on the outer wall of body 51, both for stiffening recessed housing 50, and for serving as anchoring members to hold housing 50 in the concrete slab in which it will be placed.

Figure 6A:
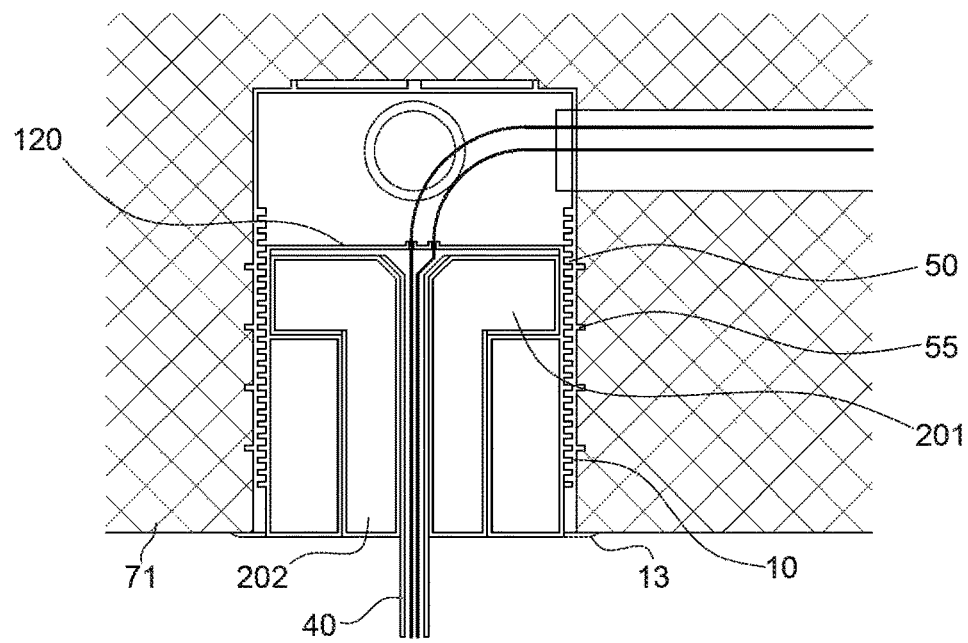
FIGS. 6a and 6b are respectively cross-sectional views of a kit according to the invention installed in a ceiling and of a kit according to the invention installed in a suspended ceiling.

According to a particular aspect of the invention, on the inner face of body 51, recessed housing 50 has locking and adjustment means for the connection device described above. The locking and adjustment means allow adjustment of the position of female socket 10 in recessed housing 50 so that female socket 10 is flush with the surface of ceiling 71, as illustrated in FIG. 6a.

More precisely, the adjustment means are formed by grooves 56 on the inner face of body 51 of recessed housing 50. According to one embodiment of the invention, grooves 56 extend throughout all or part of the height of recessed housing 50, and take the form of at least two assemblies, offset by an angle of 90° with respect to each other, so that the two assemblies face each other and each occupy a quarter of the available surface.

The number of grooves 56 can vary according to the requirements of those skilled in the art, the inner face of body 51 including at least two grooves in order to lock female socket 10. The distance between each groove 56 may also be variable and is preferably comprised between 1 and 5 mm.

These sets of grooves 56 are configured to cooperate by a screw connection with female socket 10. For this purpose, female socket 10 also has, on its outer wall, two more sets of corresponding grooves 15 as is shown, in particular, in FIG. 1a.

The locking means include at least one protuberance 57 formed between each groove 56, each protuberance 57 being configured to cooperate with female socket 10 of the recessed device and to lock it, possibly permanently, in recessed housing 50.

Recessed housing 50 may also have stop means 58 in proximity to each protuberance 57, so as to limit the rotation of female socket 10 in recessed housing 50.

As illustrated in FIG. 3c, recessed housing 50 may be fitted with a cover 60 to close opening 59 and serve as a fixing component for holding recessed housing 50 in place during the manufacture of the concrete slab forming ceiling 71.

Thus, to assemble female socket 10 to recessed housing 50, female socket 10 is inserted into recessed housing 50 and slid until annular rim 54 is flush with the ceiling, then female socket 10 is turned a quarter-turn such that the sets of grooves 56 of recessed housing 50 cooperate with the other sets of grooves 15 of female socket 10. At the end of the rotation, the operator must apply force so that each protuberance 57 exerts a friction force sufficient to prevent female socket 10 becoming detached from recessed housing 50.

The invention also concerns a mounting kit for connecting an electrical device in a connection device, comprising a recessed housing 50 intended to be permanently fixed in a ceiling, a female socket 10 intended to be installed in the recessed housing, female socket 10 comprising a first electrical connector 11 intended to be connected to the electrical grid, a male plug 20 comprising a second electrical connector 21 and adapted to cooperate with female socket 10 such that second electrical connector 21 cooperates with first electrical connector 11, and an electrical conductor 40 comprising a first end 41 connected to second electrical connector 21, and another end 42 configured to be connected to an electrical device, the electrical conductor extending through male plug 20.

A kit according to the invention makes it particularly quick and simple to install an electrical device in the ceiling.

Indeed, the kit according to the invention allows a particularly simple mounting method, illustrated in FIGS. 5a to 5f, to be implemented.

The kit is mounted as follows an electrician fixes cover 60 to the formwork forming the concrete slab, using a nail, for example;

recessed housing 50 is then snapped onto cover 60 and electric sheaths are installed hermetically through fracturable openings 53;

the concrete slab is poured to form the ceiling;

the formwork is removed once the concrete slab is dry;

the electrician pulls or runs the electrical wires through recessed housing 50;

the electrician then connects first connector 11 of female socket 10 to the electrical wires;

finally, the electrician inserts and locks female socket 10 in recessed housing 50 so that support collar 13 rests against ceiling 71.

Finally, a person such as the occupant of the building can then insert and lock male plug 20 in female socket 10 so that the first and second electrical connectors 11 and 21 cooperate and to establish an electrical connection for powering the electrical device without having to use tools.

In the case where the attachment of cover 60 must be secure and robust, the electrician can fix cover 60 onto the formwork using several nails and thus improve the hold of cover 60.

Figure 6B:
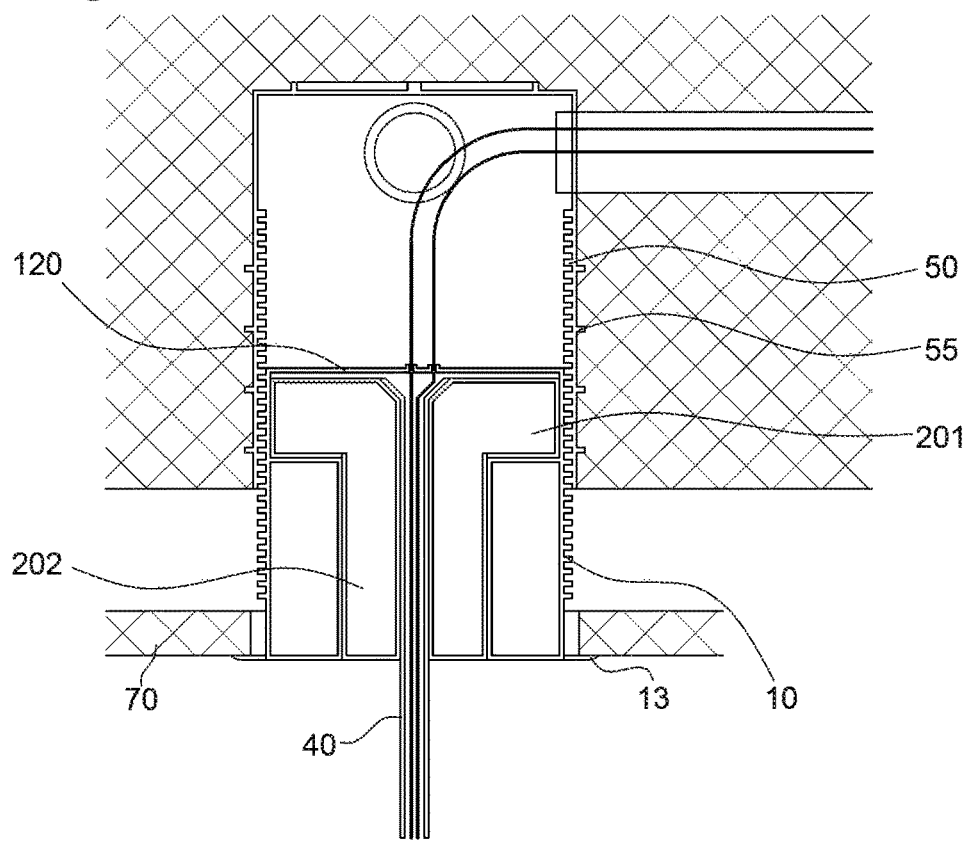

As can be observed in FIG. 6b, this kit can also be used with a suspended ceiling 70, the position of female socket 10 in recessed housing 50 can then easily be adjusted so that female socket 10 is flush with suspended ceiling 70.

As a result of these different aspects of the invention, there is provided a kit of simple design allowing an electrical device, such as an interior light or a fan, to be easily installed. Evidently, other electrical devices can be installed using the kit according to the invention.

Of course, the present invention is not limited to the illustrated example and is capable of various variants and modifications which will be clear to those skilled in the art. Thus, male plug 20 and female socket 10 can be inverted, male plug 20 being fixed in a wall mount, and female socket 10 being removably fixed to male plug 20.

NOMENCLATURE

| | |
|---|---|
| 1. Connection device, | 40. Electrical conductor, |
| 10. Female socket, | 41. First end of the conductor, |
| 10a. Outer envelope, | 42. Second end of the conductor, |
| 11. First electrical connector, | 43. Electrical wires, |
| 12. Cavity, | 50. Recessed housing, |
| 120. Bottom of the female socket, | 51. Housing body, |
| 121. Cavity entrance, | 52. Housing bottom, |
| 122. Recess, | 53. Fracturable openings |
| 123. Protuberances, | 54. Annular rim of the housing, |
| 124. Lower recess edges, | 55. Ribs, |
| 13. Support collar, | 56. Grooves, |
| 14. Recessed pocket | 57. Protuberances |
| 15. Grooves, | 58. Stops, |
| 20. Male plug, | 59. Housing opening, |
| 201. Male plug head, | 60. Cover, |
| 202. Male plug body, | 70. Suspended ceiling, |
| 21. Second electrical connector, | 71. Ceiling, |
| 22. Duct, | A. Axis, |
| 23. Mounting plate, | h. Recess height, |
| 30. Housing | H. Cavity height. |
| 31. Shoulder, | |

The invention claimed is:

1. A connection device comprising:
   a female socket intended to be installed in a ceiling, the female socket comprising a cavity having a bottom receiving a first electrical connector intended to be at least indirectly connected to an electrical grid;
   a male plug comprising a second electrical connector and having a complementary shape to the female socket cavity, configured to removably engage in the female part, the male plug being able to change from an unlocked position in which the male plug can be inserted into the female socket, to a locked position in which the male plug is secured to the female socket and the second electrical connector cooperates axially with the first electrical connector;
   an electrical conductor comprising a first end connected to the second electrical connector, and another end configured to be connected to an electrical device, the electrical conductor extending through the male plug, the male plug and the electrical conductor being two distinct elements;
   wherein the male plug includes a duct extending throughout the height of the male plug, said duct leading to a housing provided with a shoulder formed in the male plug, said housing being arranged to receive the second electrical connector, and
   wherein the electrical conductor and the second electrical connector form a one-piece element arranged to be inserted into the duct of the male plug until the second electrical connector abuts against the shoulder in the housing such that the second electrical connector rests on the shoulder of the housing and bears the weight of the electrical device.

2. The connection device according to claim 1, wherein the second electrical connector is free to rotate inside the housing.

3. The connection device according to claim 1, wherein the second electrical connector has a complementary shape to the shoulder.

4. The connection device according to claim 1, wherein the male plug is in one piece and is T-shaped, the body of the T shape being cylindrical and the head of the T being substantially oblong.

5. The connection device according to claim 4, wherein the second electrical connector is disposed on the top of the head of the T of the male plug.

6. The connection device according to claim 4, wherein the second electrical connector is disposed on one of the sides of the head of the T of the male plug.

7. The connection device according to claim 1, wherein the second electrical connector is flush with the surface of the male plug, such that the second electrical connector is held in contact with the first electrical connector when the male plug is in the locked position.

8. The connection device according to claim 1, further comprising means for engaging the male part in the female part.

9. The connection device according to claim 1, wherein the female socket comprises means for locking the male plug in the female socket in a locked position.

10. The connection device according to claim 1, wherein the male plug, the female socket and the second electrical conductor are made of vulcanized rubber.

11. The connection device according to claim 1, wherein the female part includes at least one electronic device connected to the electrical grid independently of the first electrical connector.

12. The connection device according to claim 11, wherein the female part includes at least one housing configured to receive said electronic device.

13. The connection device according to claim 11, wherein the electronic device is a wireless communication means.

14. The connection device according to claim 11, wherein the electronic device is a smoke detector.

15. An assembly comprising:
   a recessed housing intended to be permanently fixed in a mount, the recessed housing comprising:
      a body having a bottom,
      openings for the passage of electrical cables, arranged in proximity to the bottom,
      ribs, formed on the outer wall of the body, to stiffen the recessed housing, and
      locking and adjustment means, formed on the inner surface of the body, and
   configured to cooperate with a female socket of a connection device; and
   the female socket of the connection device comprising grooves formed on its outer wall, arranged to cooperate with the locking and adjustment means of the recessed housing in order to adjust the position of the female socket with respect to the recessed housing, the locking means comprising at least one protuberance configured to cooperate with the female socket of the connection device.

16. The assembly according to claim 15, wherein the grooves cooperate with the locking means of the recessed housing in order to hold in position the female socket with respect to the recessed housing.

17. The assembly according to claim 15, wherein the adjustment means comprise grooves formed on the inner wall of the body, intended to cooperate with the female socket of the connection device.

18. A mounting kit for connecting an electrical device in a connection device, comprising a recessed housing intended to be permanently fixed in a wall mount, a female socket intended to be installed in the recessed housing, the female socket comprising grooves configured to cooperate with grooves of the recessed housing so as to adjust the position of the female socket with respect to the recessed housing, the mounting kit comprising:
   a male plug configured to be rotatably mounted and locked in the female socket to establish an electrical connection between the male plug and the female socket,
   wherein a second electrical connector of the male plug can bear the weight of the electrical device when the kit is assembled.

19. The mounting kit according to claim 18, wherein the electronic device is a light.

20. The mounting kit according to claim 18, wherein the electronic device is a fan.

21. A method for mounting the mounting kit according to claim 18, comprising:
   positioning the recessed housing;
   pouring concrete slab forming a ceiling;
   pulling or running electrical wires through the recessed housing;
   connecting a first connector of the female socket to the electrical wires;
   inserting and locking the female socket in the recessed housing; and
   inserting and locking the male plug in the female socket so that the first electrical connector cooperates with the second electrical connector.

* * * * *

UNITED STATES PATENT AND TRADEMARK OFFICE
CERTIFICATE OF CORRECTION

PATENT NO. : 10,316,851 B2
APPLICATION NO. : 15/745179
DATED : June 11, 2019
INVENTOR(S) : Sonia Heiniger et al.

Page 1 of 1

It is certified that error appears in the above-identified patent and that said Letters Patent is hereby corrected as shown below:

On the Title Page

Item (71) Applicants, insert --Jacques Finkbeiner, La Fouley (CH)--, and delete "Charles Humbert, Lechelles (CH)".

Signed and Sealed this
Tenth Day of December, 2019

Andrei Iancu
*Director of the United States Patent and Trademark Office*